United States Patent
Govindarajan et al.

(10) Patent No.: US 12,242,377 B2
(45) Date of Patent: *Mar. 4, 2025

(54) MULTI-PERIPHERAL AND/OR MULTI-FUNCTION EXPORT

(71) Applicant: Texas Instruments Incorporated, Dallas, TX (US)

(72) Inventors: Sriramakrishnan Govindarajan, Bangalore (IN); Kishon Vijay Abraham Israel Vijayponraj, Bangalore (IN); Mihir Narendra Mody, Bangalore (IN); Vijaya Rama Raju Kanumuri, Allen, TX (US); Cory Dean Stewart, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,178

(22) Filed: Oct. 27, 2023

(65) Prior Publication Data

US 2024/0061768 A1 Feb. 22, 2024

Related U.S. Application Data

(63) Continuation of application No. 17/538,662, filed on Nov. 30, 2021, now Pat. No. 11,853,199.
(Continued)

(51) Int. Cl.
*G06F 12/00* (2006.01)
*G06F 9/46* (2006.01)
(Continued)

(52) U.S. Cl.
CPC .......... *G06F 12/0238* (2013.01); *G06F 9/467* (2013.01); *G06F 12/0292* (2013.01); *G06F 12/063* (2013.01)

(58) Field of Classification Search
CPC .. G06F 12/0238; G06F 9/467; G06F 12/0292; G06F 12/063; G06F 12/1036;
(Continued)

(56) References Cited

U.S. PATENT DOCUMENTS

| 1,030,144 A | 6/1912 | Tyne |
| 7,225,287 B2 | 5/2007 | Wooten et al. |

(Continued)

OTHER PUBLICATIONS

International Search Report and Written Opinion for International Patent Application No. PCT/US2022/013217, dated May 5, 2022, eight pages.

*Primary Examiner* — Arvind Talukdar
(74) *Attorney, Agent, or Firm* — Michael T. Gabrik; Frank D. Cimino

(57) ABSTRACT

Transaction mappers, methods and systems are provided. An example transaction mapper includes a table that associates virtual identification values with bus-device-function (BDF) values; and a firewall that receives an input-output request including a first virtual identification value of the virtual identification values, the first virtual identification value being associated with a function of an external peripheral, generates a first BDF value and a first traffic class value based on the table and the first virtual identification value, determine whether the first virtual identification value satisfies a threshold range, and determine whether to forward the input-output request to an external host device based on whether the first virtual identification value satisfies the threshold range.

20 Claims, 7 Drawing Sheets

Related U.S. Application Data

(60) Provisional application No. 63/140,085, filed on Jan. 21, 2021.

(51) Int. Cl.
  *G06F 12/02* (2006.01)
  *G06F 12/06* (2006.01)

(58) Field of Classification Search
  CPC ........ G06F 3/06; G06F 11/1446; G06F 12/00; G06F 13/16
  See application file for complete search history.

(56) References Cited

U.S. PATENT DOCUMENTS

| | | |
|---|---|---|
| 9,542,350 B1 | 1/2017 | Kissell |
| 10,402,355 B2 | 9/2019 | Karguth |
| 10,949,357 B2 | 3/2021 | Govindarajan et al. |
| 11,030,144 B2 | 6/2021 | Jones et al. |
| 2005/0216384 A1 | 9/2005 | Partlow et al. |
| 2006/0239287 A1* | 10/2006 | Johnsen ................ H04L 45/566 370/412 |
| 2008/0304711 A1 | 12/2008 | Boyd |
| 2008/0307116 A1 | 12/2008 | Boyd et al. |
| 2012/0246381 A1 | 9/2012 | Kegel et al. |
| 2013/0145055 A1 | 6/2013 | Kegel et al. |
| 2014/0173236 A1 | 6/2014 | Kegel et al. |
| 2019/0042329 A1* | 2/2019 | Kakaiya ................ G06F 9/5088 |
| 2021/0064525 A1* | 3/2021 | Tian .................... G06F 12/1081 |

\* cited by examiner

MULTI-PERIPHERAL AND/OR MULTI-FUNCTION EXPORT

This application is a continuation of, and claims priority on, U.S. patent application Ser. No. 17/538,662, filed Nov. 30, 2021, which claims the benefit of U.S. Provisional Patent Application No. 63/140,085, filed Jan. 21, 2021. The entire content of each of these prior applications is incorporated by reference herein.

BACKGROUND

Many modern computers include intelligent input-output devices to improve the processing capabilities of the computer. These intelligent input-output devices often include a system-on-a-chip, which includes a microprocessor and has a connected memory. Of course, the computer includes its own main microprocessor and memory. The presence of multiple microprocessors often creates a situation of disparate address spaces between the various microprocessors. The intelligent input-output devices are often connected to the computer using advanced interfaces, such as Peripheral Component Interconnect Express (PCIe). PCIe includes its own address space, which is in addition to the address spaces of the various microprocessors. These multiple address spaces have, at times, required address translations at each step and in each direction, thereby complicating the overall computer system design.

SUMMARY

In some examples, a transaction mapper includes a table that associates virtual identification values with bus-device-function (BDF) values; and a firewall. The firewall is configured to receive an input-output request including a first virtual identification value of the virtual identification values, the first virtual identification value being associated with a function of an external peripheral, generate a first BDF value and a first traffic class value based on the table and the first virtual identification value, determine whether the first virtual identification value satisfies a threshold range, and determine whether to forward the input-output request to an external host device based on whether the first virtual identification value satisfies the threshold range.

In further examples, a method includes receiving, by a transaction mapper, an input-output request including a first virtual identification value and an address space select value, the first virtual identification value being associated with a function of an external peripheral and the address space select value being based on the first virtual identification value; generating, by the transaction mapper, a first bus-device-function (BDF) value based on the first virtual identification value, using a table that associates virtual identification values with BDF values, the first virtual identification value being associated with the first BDF value in the table; determining, by the transaction mapper, whether the first virtual identification value satisfies a threshold range; and determining, by the transaction mapper, whether to forward the input-output request to an external host device based on whether the first virtual identification value satisfies the threshold range.

In yet further examples, a system includes a first peripheral circuit including first and second channels and first and second credential generators associated with the first and second channels, respectively; a second peripheral circuit including a third credential generator; a memory management circuit coupled to the first and second peripheral circuits; and a transaction mapper circuit coupled to the memory management circuit. The first and second credential generators are configured to generate first and second virtual identification values, respectively, the first virtual identification value establishing a unique association between the first channel and a first function of the first peripheral circuit, and the second virtual identification value establishing a unique association between the second channel and a second function of the first peripheral circuit.

BRIEF DESCRIPTION OF THE DRAWINGS

Features of the present invention may be understood from the following detailed description and the accompanying drawings. In that regard.

DETAILED DESCRIPTION

Specific examples are described below in detail with reference to the accompanying figures. It is understood that these examples are not intended to be limiting, and unless otherwise noted, no feature is required for any particular example. Moreover, the formation of a first feature over or on a second feature in the description that follows may include examples in which the first and second features are formed in direct contact and examples in which additional features are formed between the first and second features, such that the first and second features are not in direct contact.

The processor in a computer may be coupled to one or more peripheral circuits such as network cards, network switches, storage adapters, and memory systems. The processor and each of the peripherals may have a distinct address space used to specify data, memory mapped functions, etc., such that communication between each component involves translating between the address spaces. A system may include multiple peripherals, where one or more of the peripherals includes multiple functions. This disclosure describes techniques for peripherals generating and sending input-output requests through a system including multiple peripherals and/or multiple functions. The input-output requests can be routed through the system using virtual identification values generated by the peripherals. Of course, these advantages are merely examples, and no advantage is required for any particular embodiment.

Figure 1:
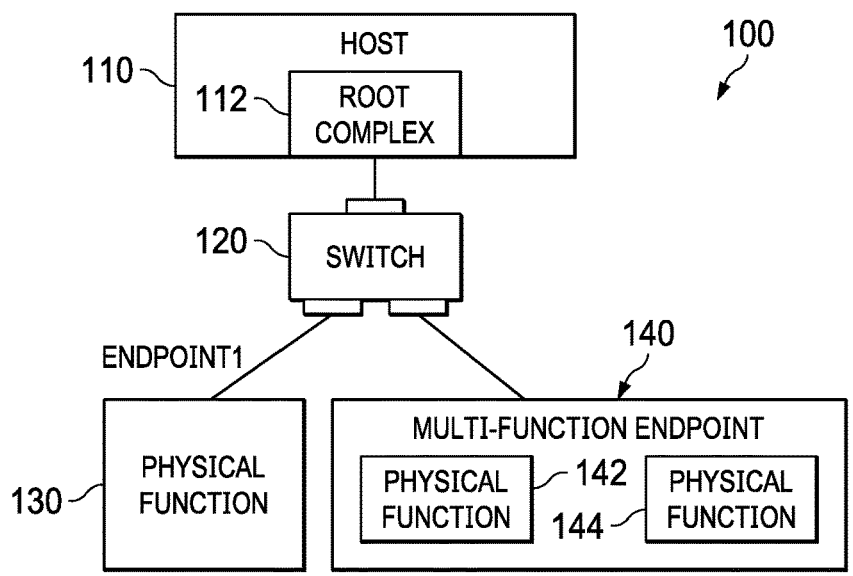
FIG. 1 is a conceptual block diagram of Peripheral Component Interconnect Express bus topology according to some aspects of the present disclosure.

Examples of input-output requests in a system with multiple endpoints and multiple functions are described with reference to the figures below. In that regard, FIG. 1 is a conceptual block diagram of Peripheral Component Interconnect Express (PCIe) bus topology according to some aspects of the present disclosure. In the example shown in FIG. 1, system 100 includes host 110, PCI root complex 112, switch 120, and endpoints 130 and 140. Although this disclosure describes systems within PCIe topology, other topologies may implement the techniques of this disclosure, such as ExpressCard, advanced technology attachment (ATA), and Thunderbolt topologies. Another example topology is the HyperLink communication protocol developed by Texas Instruments, Incorporated of Dallas, Texas.

System 100 may be part of an industrial facility, an automobile or other vehicle (e.g., aircraft or marine vessel), an electronic device, and/or any other system. For example, host 110 may be a remote processor within an automobile that supports a camera sensor and back-up video functionality of the automobile. Host 110 may include a radar processor and support radar sensing and ranging functionality of the automobile (e.g., to support proximity warnings and/or self-driving functionality).

Host 110 may be referred to as a remote system on chip (SOC) or as a remote host. In some examples, host 110 may be replaced by a processor that is not a system on a chip. Host 110 is the root of the tree depicted in FIG. 1, and root complex 112 anchors the tree. Host 110 may be configured to detect and configure the connected devices of system 100. Switch 120 may be configured to implement a PCIe bridge interconnecting the upstream and downstream ports on host 110 and endpoints 130 and 140. Switch 120 acts as an intermediate node and provides connectivity between host 110 and endpoints 130 and 140.

Endpoints 130 and 140 are the leaf nodes of the hierarchy shown in FIG. 1 and implement functionality such as storage, networking, and the like. One or both of endpoints 130 and 140 may be implemented as standalone hardware. For example, endpoints 130 and 140 may be part of a single SOC, or each of endpoints 130 and 140 may be part of separate SOCs. Endpoint 140, for example, may include an SOC with multiple peripherals. One or more peripherals in an SOC context can be mapped as a single PCIe function for access from host 110. Endpoint 130 is depicted in FIG. 1 as a single-function endpoint, and endpoint 140 is depicted in FIG. 1 as a multifunction endpoint (e.g., a compound or composite device). FIG. 1 shows two endpoints, but system 100 may include any number of endpoints, where each endpoint may support a single function or multiple functions.

In some examples, endpoint 130 is configured as an ethernet controller, physical function 142 of endpoint 140 is configured as a USB controller, and physical function 142 of endpoint 140 is configured as a serial ATA (SATA) controller. The functions of endpoints 130 and 140 shown in FIG. 1 are merely examples, and other functions are contemplated by this disclosure, including storage adapters, network cards, digital signal processors, and hardware accelerators. PCIe allows for system 100 to integrate multiple capabilities by mapping existing functionality over PCIe to host 110. Each of endpoints 130 and 140 may have one or more fixed functions (e.g., ethernet, USB, SATA, etc.). Additionally or alternatively, endpoints 130 and/or 140 may be integrated in an SOC and configured to perform a desired function.

The connection between host 110 and endpoints 130 and 140 may include switch 120, one or more input lines, and one or more output lines. These lines may include serial communication lines and/or parallel conductors. In the example shown in FIG. 1, physical functions 142 and 144 share the same physical link with switch 120.

Each of the functions in endpoints 130 and 140 is identified by a bus-device-function (BDF) value or tuple. Each BDF value indicates the source of an input-output request using three fields: a first field represents the bus, a second field represents the device, and a third field represents the respective function. The BDF value can be part of or appended to an input-output request. Each level within the tree has a unique bus number assignment, and each device has a unique device number assignment. A single device such as endpoint 140 having multiple functions 142 and 144 may have multiple assigned function numbers. The function number in a BDF value designates which of functions 142 and 144 originated the input-output request.

FIG. 1 shows two endpoints 130 and 140, but more endpoints may be coupled to system 100. PCIe allows for the attachment of multiple devices on the fly, with the potential for extending the capability with an external bus interconnect. Each endpoint may have a unique address space, such that communication between the components of system 100 may involve one or more translation steps for the address(es) in an input-output request.

Figure 2:
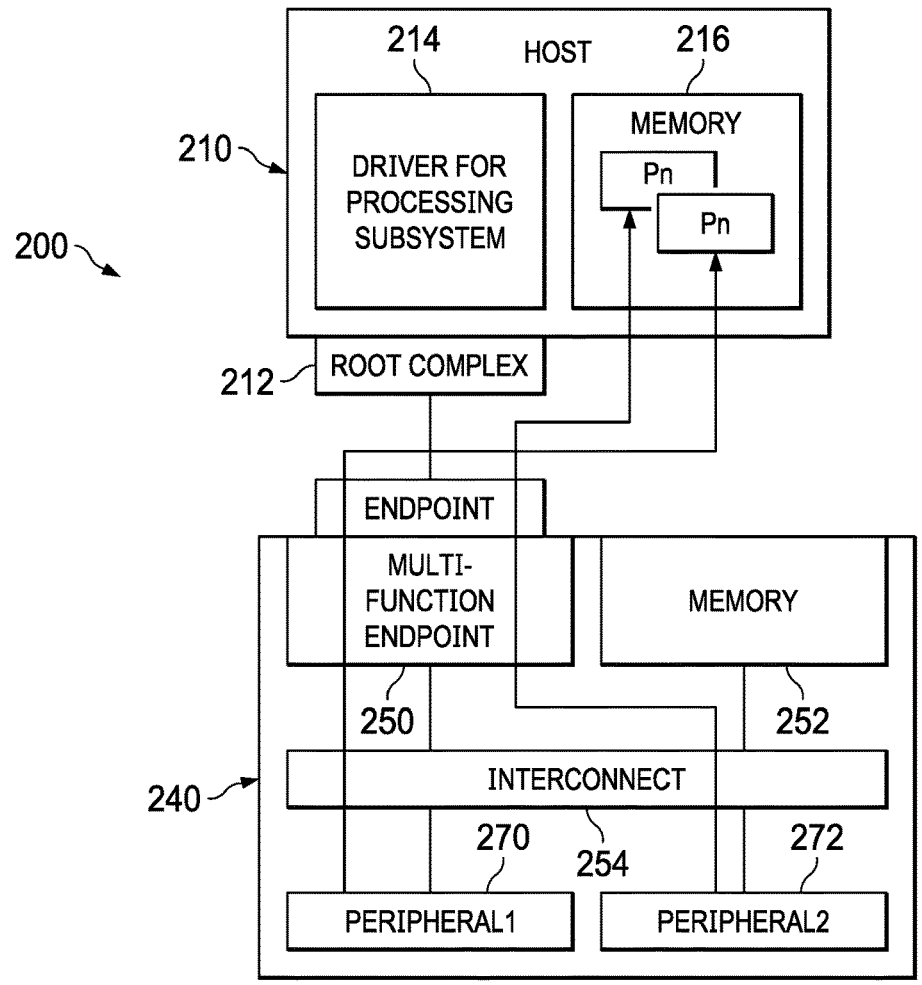
FIG. 2 is a conceptual block diagram of multiple peripherals mapped for access from a remote host according to some aspects of the present disclosure.

FIG. 2 is a conceptual block diagram of multiple peripherals 270 and 272 mapped for access from a remote host 210 according to some aspects of the present disclosure. System 200 includes host 210 and subsystem 240. Subsystem 240 includes endpoint 250, memory 252, interconnect 254, and peripherals 270 and 272. Subsystem 240 may be implemented as a dedicated PCIe function or realized as part of a larger SOC with other functionality. On an SOC, processors, memory, and peripherals can be connected through a local interconnect and share the same local internal address space of the SOC. A SOC can implement multiple peripherals 270 and 272 and the integrated PCIe endpoint functionality of subsystem 240. Any of the available peripherals can be flexibly mapped in the SOC for access from remote host 210.

In order for peripheral 272 to interact with remote host 210 via root complex 212, peripheral 272 or an intermediary converts addresses in the remote host address space into the local address space of the subsystem 240 and vice-versa. Peripheral 272 can be enabled to work directly with the remote host address space using an address space value, which can allow peripheral 272 to generate input-output requests to host 210 using the address space of host 210. Interconnect 254 may be configured to forward transactions within subsystem 240 based on the address select value in each request. Based on the address select value in a request, interconnect 254 may be configured to forward the request to endpoint 250 without decoding or translating the address in the request. Interconnect 254 uses the address select value to determine which endpoint instance should receive the request. Thus, peripheral 270 or 272 can issue input-output requests using the address space of the remote host, and the address can pass through subsystem 240 without being decoded or translated. Interconnect 254 may directly forward the request to endpoint 250, which may forward the request to host 210 without translating the address in the request. Additional details on address space translation can be found in commonly assigned U.S. Pat. No. 10,402,355, entitled "Apparatus and Mechanism to Bypass Address Translation by Using Alternative Routing," issued on Sep. 3, 2019, which is incorporated herein by reference.

For many use-cases, such as input-output companions, gateway devices, or multi-chip systems, system 200 may support multiple peripherals 270 and 272 mapped over PCIe in a multi-function endpoint configuration. In some examples, a single peripheral will have multiple logical channels that system 200 can map as independent virtual functions. For example, peripheral 272 may have a single physical function and multiple virtual functions supported underneath that physical function. In the case of virtualization, the same peripheral can present as an interface for multiple virtual functions, allowing concurrent usage from multiple virtual machines running on host 210.

Additionally or alternatively, peripheral 270 may support a function that is independent from the function supported by peripheral 272. Thus, it may be desirable to map multiple peripherals 270 and 272 to work with the address space of host 210, especially without having to translate the address in a request. Peripherals 270 and 272 may be independent PCIe functions mapped over PCIe to host 210 (e.g., in multi-function endpoint mode) and the mapping of multiple virtual functions (e.g., single root input-output virtualization functionality) for peripheral 270 or 272.

In addition, it may be desirable to have backwards compatibility with existing peripherals with no or minimal changes. There may be endpoints and/or peripherals that have been used throughout multiple generations of system 200. Other endpoints and peripherals are made by third parties that may continue to produce hardware without new functionality. For example, peripheral 270 or 272 may not be capable of generating an address space select value for an input-output request. The processing sub-system controller for each peripheral may have been developed by a third party or be mandated by a standard, such as the extensible host controller interface standard. Thus, it may be difficult to configure peripheral 270 and 272 to generate address space select values for input-output requests.

Moreover, when multiple functions are supported by a single endpoint, it may be important to ensure that a peripheral is uniquely bound to each particular function instance. Also, from the standpoint of safety and security, endpoint 250 may be configured to isolate between functions and the associated mappings of peripherals. Isolation between functions in system 200 promotes separation and freedom from interference. Thus, traffic that comes from peripheral 270 should be disjoined from the traffic that is mapped and allowed for peripheral 272.

In accordance with the techniques of this disclosure, each of peripherals 270 and 272 includes a credential generator configured to include a virtual identification value in input-output requests outputted by the peripheral. Each credential generator may be configured to generate a unique virtual identification value, and multi-function peripherals may include two or more credential generators so that each function is associated with a unique virtual identification value. Thus, a system of this disclosure may have per-peripheral credential generation, per-function credential generation, and/or per-channel credential generation to promote separation between the traffic generated by each peripheral, function, and/or channel.

Figure 3:
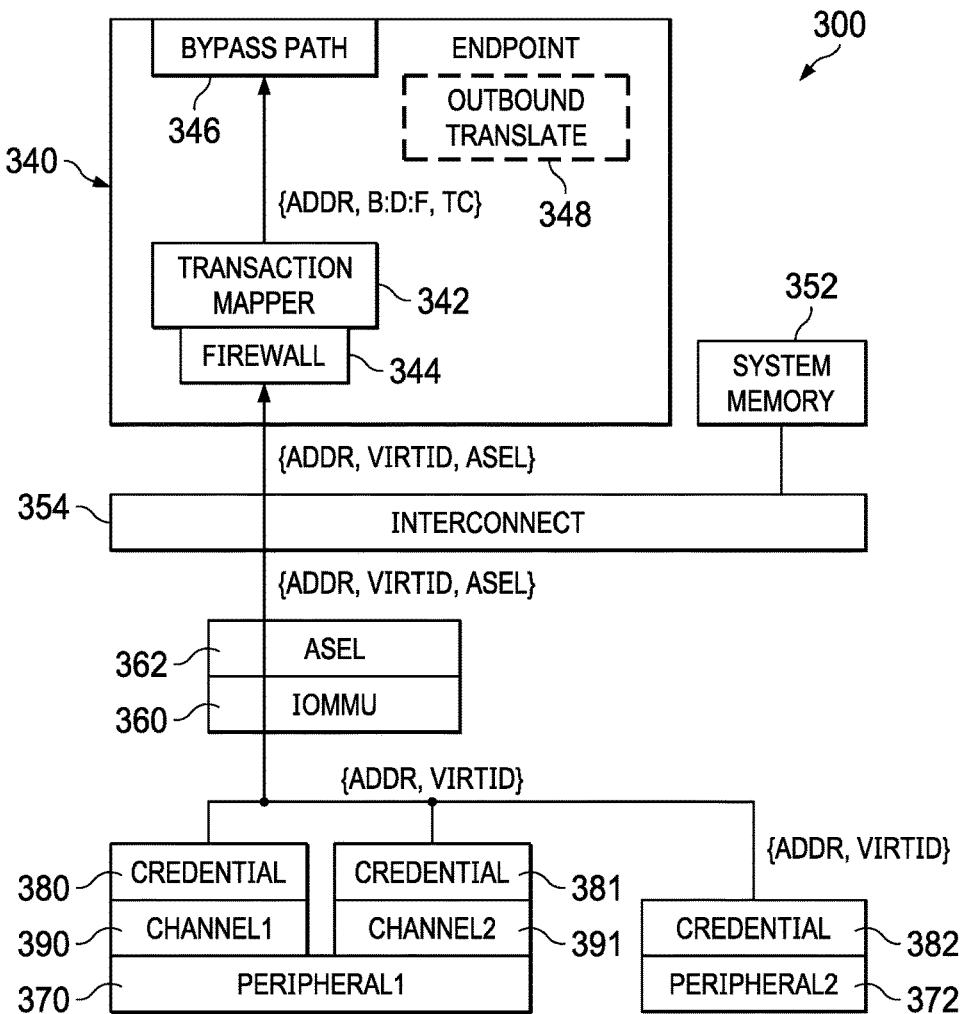
FIG. 3 is a conceptual block diagram of a system configured for multi-peripheral export to a remote host according to some aspects of the present disclosure.

FIG. 3 is a conceptual block diagram of a system 300 configured for multi-peripheral export to a remote host according to some aspects of the present disclosure. System 300 includes endpoint 340, system memory 352, interconnect 354, input-output memory management unit (IOMMU) 360, and peripherals 370 and 372. In the example shown in FIG. 3, endpoint 340 includes transaction mapper 342, firewall 344, bypass path 346, and outbound translation circuit 348, and IOMMU 360 includes address space select table 362. Peripheral 370 includes credential generators 380 and 381 and direct memory access (DMA) channels 390 and 391, and peripheral 372 includes credential generator 382. Additionally or alternatively, one or more of credential generators 380-382 and one or more of DMA channels 390 and 391 may be separate from and coupled to peripheral 370 and/or 372.

In some examples, system 300 is part of an SOC that includes endpoint 340, system memory 352, interconnect 354, IOMMU 360, and peripherals 370 and 372. Peripherals 370 and 372 may be instantiated within the SOC. Endpoint 340 may also be considered as a peripheral within the SOC. System 300 supports multi-peripheral export with address space select tunneling by assigning an address space select value to an input-output request and then routing the input-output request through bypass path 346 to bypass outbound translation circuit 348. The address space select value is labeled in FIG. 3 as "asel". Using transaction mapper 342, address space select table 362, and credential generators 380-382, system 300 can authenticate an input-output request and generate transaction attributes for access from peripherals 370 and 372 to a remote host buffer. FIG. 3 shows input-output requests flowing in one direction (e.g., from peripherals 370 and 372 through endpoint 340 to a host), but signals may also travel in the opposite direction. For example, the host may be configured to initialize or configure one or both of peripherals 370 and 372 by sending control configuration messages through endpoint 340.

An input-output request generated by peripheral 370 or 372 may include a read request, write request, and/or some other type of communication. As generated by peripheral 370 or 372, the input-output request may include a virtual identification value and an address that specifies where to write data or from where to read data. The address is labeled in FIG. 3 as "addr" and stays with the input-output request through IOMMU 360, interconnect 354, and endpoint 340. The address may refer to the address space of the remote host, so that the address is not translated as the request passes through IOMMU 360 and interconnect 354. Peripherals 370 and 372 may send input-output requests through system 300 to destinations such as a remote host device over PCIe or other local destinations like system memory 352. For example, interconnect 354 may treat a particular address select value (e.g., zero) as local transactions. In response to determining that the address select value in a request has the particular value, interconnect 354 may be configured to forward the request to system memory 352.

Each of peripherals 370 and 372 includes or is coupled to at least one credential generator 380-382. Each of credential generators 380-382 resides on the boundary of the respective peripheral 370 or 372. Older peripherals lacking the ability to generate an address space select value may still be compatible with system 300 because these older peripherals have the hardware necessary to implement credential generators 380-382. This hardware may have been originally added so that peripherals 370 and 372 support virtualization in system 300.

Thus, the hardware within peripherals 370 and 372 can be reused or repurposed to generate virtual identification values for input-output requests. This repurposing may include updating the software for credential generators 380-382 to generate the virtual identification values. In the example of peripheral 370, credential generators 380 and 381 may be configured to generate unique credentials for each of logical channels 390 and 391, creating a granular mapping for peripheral 370. Credential generators 380 and 381 can generate virtual identification values that indicate or identify a specific endpoint instance to which IOMMU 360 should send the input-output request. For example, each of credential generators 380 and 381 may be configured to generate a virtual identification value for each input-output request that peripheral 370 sends to the remote host. The virtual identification value may allow for IOMMU 360 to assign an address space select value to each input-output request, where the address space select value is associated with the specific endpoint instance to which the input-output request is directed.

IOMMU 360 can perform address translation and input/output access policing on input-output requests generated by peripherals 370 and 372. IOMMU 360 may be part of, or referred to as, a system MMU, a memory management circuit, or a peripheral virtual unit. In addition, IOMMU 360 may be configured to generate an address space select attribute based on the credentials associated with each transaction (e.g., each input-output request). In the example shown in FIG. 3, IOMMU 360 includes address space select table 362 that associates virtual identification values with address space select values. Table 362 may be implemented as a look-up table that receives a virtual identification value as an input and outputs an address space select value. Table 362 may be software-programmable, such that the associations between virtual identification values and address space select values can be modified by an endpoint manager, by a user, or by a software update.

In response to receiving an input-output request from channel 390 of peripheral 370, for example, IOMMU 360 may be configured to match the virtual identification value in the input-output request to an address space select value in table 362. IOMMU 360 can add the address space select value to the input-output request and forward the modified input-output request to endpoint 340 or system memory 352 via interconnect 354. In some examples, the address space select value may allow for an input-output request to bypass outbound translation circuit 348 in route to the remote host.

Endpoint 340 receives the input-output request from IOMMU 360, via interconnect 354, and can forward the input-output request to a remote host. Transaction mapper 342 may be configured to generate a BDF value based on the virtual identification value in the input-output request. Firewall 344 may be configured to block an input-output request from bypass path 346 in response to determining that the input-output request does not have the appropriate credentials. Transaction mapper 342 may drop the virtual identification value from the request before sending the request to bypass path 346, such that the input-output request forwarded by transaction mapper 342 through bypass path 346 may not include the virtual identification value.

System 300 may be capable of supporting the mapping of multiple peripherals 370 and 372 and multiple channels 390 and 391 within a single peripheral 370 to a remote host. In particular, system 300 may be able to support multiple physical functions and/or a peripheral having multiple virtual functions. The centralized scheme for generating address space select values in IOMMU 360 and the repurposed usage of credential generators 380-382 reduces or eliminates the amount of hardware modifications for system 300. For example, older peripherals that lack the ability to generate an address space select value can still operate within system 300 because IOMMU 360 has the ability to generate address space select values. In addition, system 300 may be configured to ensure isolation and separation between traffic from peripherals 370 and 372 and between traffic from channels 390 and 391.

Figure 4:
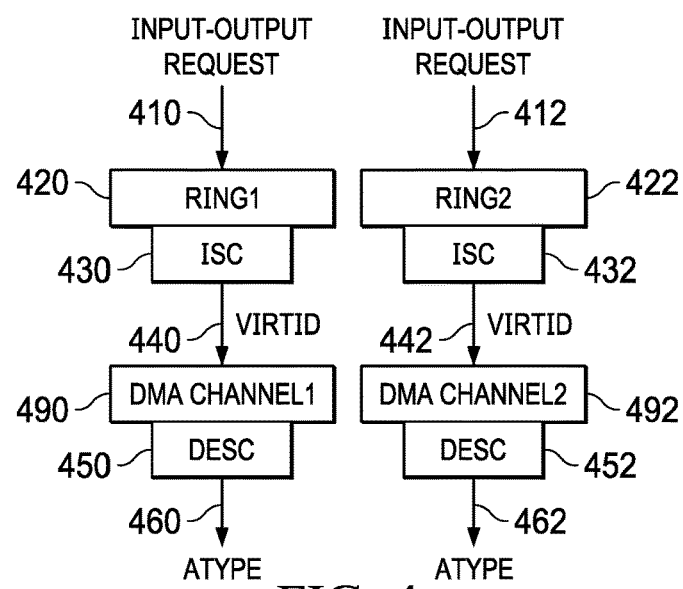
FIG. 4 is a conceptual block diagram of credential mapping according to some aspects of the present disclosure.

FIG. 4 is a conceptual block diagram of credential mapping according to some aspects of the present disclosure. FIG. 4 shows two channels for generating virtual identification values and address type values, where each channel is programmable to generate attributes or credentials that are unique to that channel. The arrangement shown in FIG. 4 is just one example of how to generate a virtual identification value; alternatively, an initiator-side security control (ISC) register can be used without a ring to generate a virtual identification value. Each channel within a peripheral may have a separate ring, ISC, and DMA channel, as shown in FIG. 4. Rings 420 and 422, ISCs 430 and 432, descriptors 450 and 452, and DMA channels 490 and 492 may be part of a single peripheral, in some examples. In the example shown in FIG. 4, credential configuration includes two steps: configuration of a virtual identification value and configuration of an address type value. The address type value may be used to steer traffic to an IOMMU for generation of an address space select value.

Rings 420 and 422 may include a hardware queue manager for input-output requests. Each of rings 420 and 422 are configured to receive a respective one of input-output requests 410 and 412. Ring 420 and ISC 430 can generate and append virtual identification value 440 to input-output request 410 before the peripheral sends input-output request 410 to a remote host. Similarly, ring 422 and ISC 432 can generate and append virtual identification value 442 to input-output request 412 before the peripheral sends input-output request 412 to a remote host. The virtual identification value may be based on the component that originated the input-output request, as well as based on the destination indicated in the request. In addition, the virtual identification value may indicate or identify a specific endpoint instance to which IOMMU 360 should send the input-output request.

Each of DMA channels 490 and 492 includes an ISC. ISCs 430 and 432 provide security control and allow for credential configuration. ISCs 430 and 432 may include programmable memory mapped registers for associating a virtual identification value with one or more input variables. Each of ISCs 430 and 432 may be software-programmable, such that the association between a virtual identification value and the one or more input variables can be modified by a user or by a software update. Each of virtual identification values 440 and 442 may be unique to a respective function within the peripheral. Each of ISCs 430 and 432 may be implemented as a central DMA resource inherited from rings 420 and 422, as an independent circuit added as a wrapper to DMA channel 490 or 492, and/or as a channelized circuit. ISCs 430 and 432 can append virtual identification values 440 and 442 to input-output requests 410 and 412 such that virtual identification values 440 and 442 are carried by input-output requests 410 and 412. Thus, an input-output request that is submitted to ring 420 will inherit the credentials that have been programmed to a register in ISC 430.

DMA channels 490 and 492 and descriptors 450 and 452 may be configured to generate address type values, also known as "A type" values 460 and 462. Each of descriptors 450 and 452 may include a register that stores an address type value. The address type value may steer an input-output request to the IOMMU, where an address space select value is generated. For example, an address type value of zero may be used to bypass the IOMMU so that the input-output request can be decoded directly by the interconnect. When more than one IOMMU is present in the system, DMA channel 490 can set address type value 460 to steer the input-output request 410 to a specific IOMMU. If only one IOMMU is capable of generating address select values, DMA channel 490 may be configured to set address type value 460 to steer input-output request 410 to that IOMMU.

Figure 5:
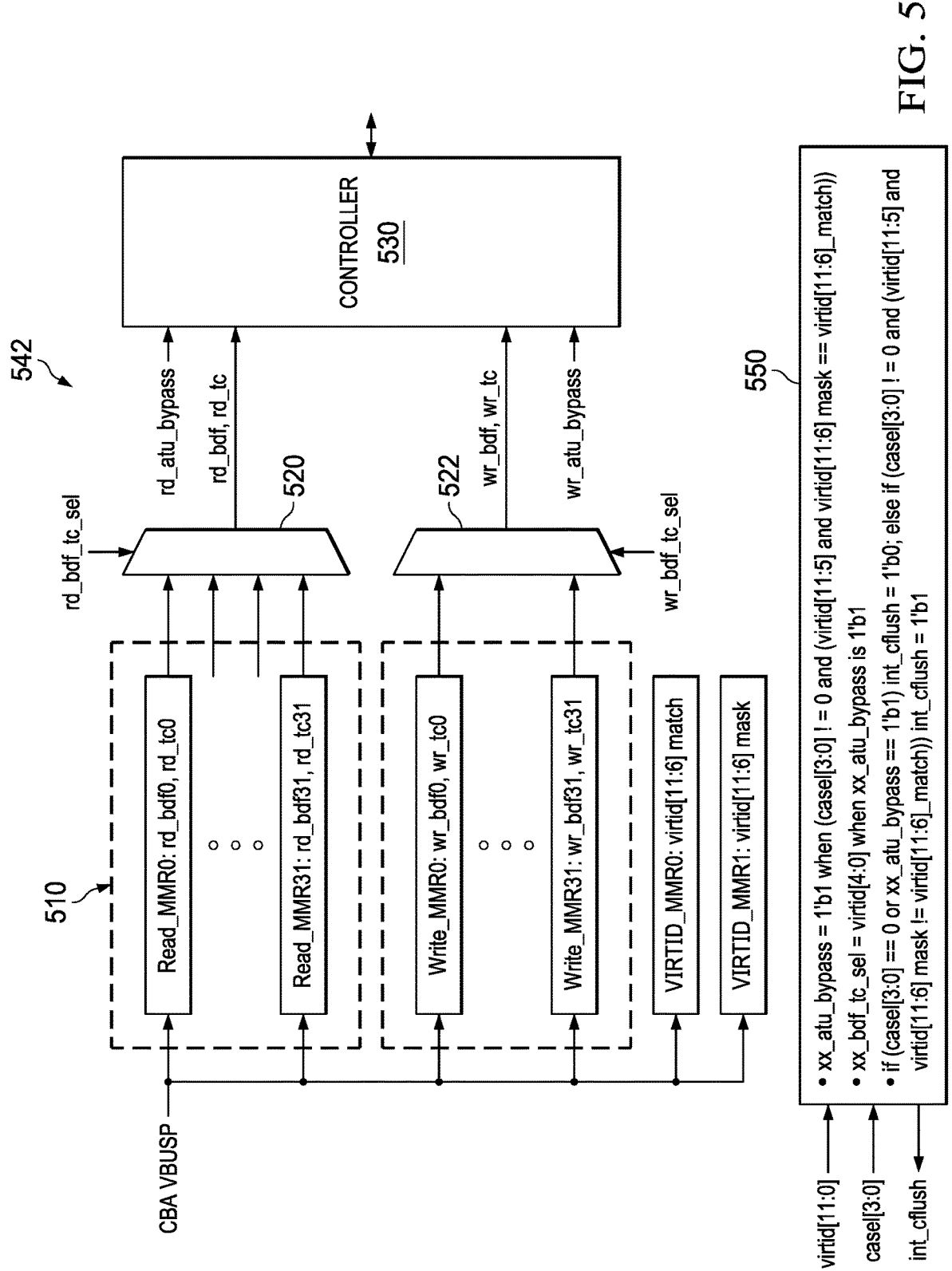
FIG. 5 is a conceptual block and circuit diagram of a transaction mapper according to some aspects of the present disclosure.

FIG. 5 is a conceptual block and circuit diagram of a transaction mapper 542 according to some aspects of the present disclosure. Transaction mapper 542 includes memory mapped registers 510, multiplexers 520 and 522, and controller 530. Transaction mapper 542 may be implemented as circuitry inside of a PCIe endpoint. In the example shown in FIG. 5, transaction mapper 542 is configured to receive a virtual identification value and an address space select value, and transaction mapper 542 is configured to output a BDF value, a traffic class value, and a bypass signal.

Transaction mapper 542 may be configured to bind a peripheral to a specific function, thereby ensuring isolation. For example, each of memory mapped registers 510 can store a BDF value and a traffic class value. FIG. 5 shows thirty-two registers for each type of operation (e.g., read or write), but any other number of registers may be used. Read multiplexer 520 receives the values stored in each of the read registers, and write multiplexer 522 receives the values stored in each of the read registers. Each of multiplexers 520 and 522 also receives at least a portion of the virtual identification value as a control input such that values stored in one of the registers is associated with each unique virtual identification value. Registers 510 and multiplexers 520 and 522 may together implement a table (e.g., a look-up table) that associates BDF values with virtual identification values. Registers 510 may be software-programmable, such that the associations between virtual identification values and BDF values can be modified by an endpoint manager, by a user, or by a software update.

In the example shown in FIG. 5, the table also associates traffic class values with virtual identification values. Traffic class values may indicate a priority level of an input-output request. In examples in which multiple peripherals are sending input-output requests over the same PCIe link, the interconnect or the endpoint may prioritize one type of input-output request over another type of input-output request, for example, based on traffic class values.

For a valid virtual identification value and a nonzero address space select value, controller 530 may be configured to bypass the address translation unit, which includes address code logic. The bypass path may be a faster path than the path through the translation unit, thereby allowing the use of an untranslated remote host address along the entire transaction handling path. For an invalid virtual identification value, controller 530 may be configured to flush the input-output request to avoid any interference between the traffic generated neighboring peripherals.

Pseudocode 550 shows an example implementation of a firewall to prevent illegitimate access to a bypass path. For example, controller 530 may be configured to execute pseudocode 550 to set the bypass signal (e.g., rd_aut_bypass or wr_aut_bypass) to one when the address space select value is nonzero and when the virtual identification value satisfies an acceptable range. Controller 530 can use a mask variable to define the acceptable range for virtual identification values. Controller 530 may be configured to control the acceptable range of virtual identification values to allow or deny each peripheral access over the PCIe link.

To initialize or configure a system that includes transaction mapper 542, an endpoint manager may be configured to first configure a credential generator with a unique value. The endpoint manager can configure the credential generator to assign the same credentials to all channels belonging to the same endpoint function, whether physical or virtual. The endpoint manager can also program registers 510 and controller 530 to associate a BDF value and a traffic class value with each virtual identification value. The endpoint manager can program the acceptable range of virtual identification values and the acceptable address space select values for bypassing translation.

Transaction mapper 542 may be configured to validate the credentials in the input-output request for freedom from interference by checking the address space select value and the incoming virtual identification value satisfies a threshold (e.g., falls within an acceptable range). Then transaction mapper 542 assigns a BDF value and a traffic class value to the input-output request based on the virtual identification value in the input-output request. Controller 530 may be configured to append the BDF value and the traffic class value as advanced extensible interface sideband signals. Transaction mapper 542 can also output a bypass signal causing the input-output request to bypass the address translation unit.

In response to determining that the credentials are invalid, transaction mapper 542 may be configured to not forward the input-output request to controller 530. For an invalid write command, the data is discarded and transaction mapper 542 returns a write status of "protection error." For an invalid read command, transaction mapper 542 returns the correct number of data phases with read data of zero and a read status of "protection error." Transaction mapper 542 may be configured to output the error to the initiator of the input-output request (e.g., the peripheral that generated the request).

Figure 6:
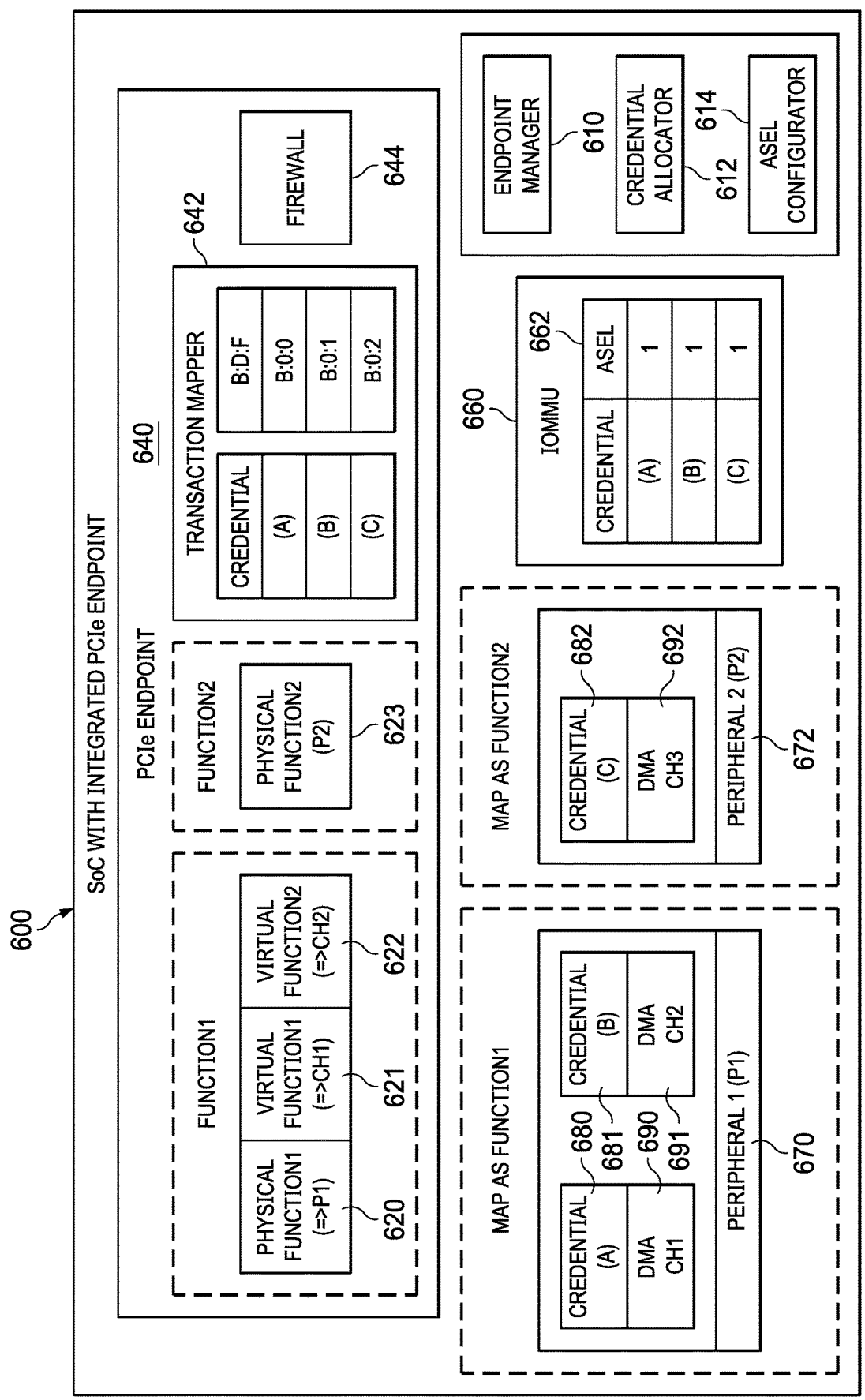
FIG. 6 is a conceptual block diagram of a system configured for multi-peripheral export to a remote host according to some aspects of the present disclosure.

FIG. 6 is a conceptual block diagram of a system 600 configured for multi-peripheral export to a remote host according to some aspects of the present disclosure. System 600 includes an SOC with an integrated PCIe endpoint instance (e.g., endpoint 640), but topologies other than PCIe may also implement system 600. System 600 includes endpoint manager 610, credential allocator 612, address space select configurator 614, endpoint 640, IOMMU 660, and peripherals 670 and 672. In the example shown in FIG. 6, endpoint 640 includes functions 620-623, transaction mapper 642, and firewall 644, and IOMMU 660 includes address space select table 662. Peripheral 670 includes credential generators 680 and 681 and DMA channels 690 and 691, and peripheral 672 includes credential generator 682.

Endpoint manager 610, credential allocator 612, and/or address space select configurator 614 may be implemented as hardware separate from any of the components shown in FIG. 6. Additionally or alternatively, endpoint manager 610, credential allocator 612, and/or address space select configurator 614 may be embodied in instructions executed by endpoint 640, by IOMMU 660, or by separate hardware. For example, system 600 may include a computational core (not shown in FIG. 6) configured to execute software instructions that implement endpoint manager 610, credential allocator 612, and/or address space select configurator 614.

In some examples, endpoint manager 610 is responsible for initializing transaction mapper 642, firewall 644, IOMMU 660, and peripherals 670 and 672. Endpoint manager 610 may be configured to map each of peripherals 670 and 672 and channels 690-692 to functions 620-623. In the example shown in FIG. 6, physical functions 620 and 623 and virtual functions 621 and 622 reside in endpoint 640.

Functions 620-623 correspond to the physical and virtual functions seen by the remote host. Endpoint manager 610 can map peripheral 670 to physical function 620 and map peripheral 672 to physical function 623. In addition, endpoint manager 610 can map channel 690 to virtual function 621 and map channel 691 to virtual function 622.

Endpoint manager 610 can also configure a table in transaction mapper 642 to map from virtual identification values to BDF values. In the example shown in FIG. 6, endpoint manager 610 uses the bus number captured by the hardware for the first field in each of the BDF values in the table. As just one example, the device number for each of the BDF values shown in FIG. 6 is equal to zero. In the example shown in FIG. 6, the table in transaction mapper 642 may associate the virtual identification value generated by credential generator 680 with a BDF value of B:0:0, associate the virtual identification value generated by credential generator 681 to a BDF value of B:0:1, and associate the virtual identification value generated by credential generator 682 to a BDF value of B:0:2. Alternatively, endpoint manager 610 can configure the lookup entries in transaction mapper 642 to have BDF values different from those shown in FIG. 6 (e.g., nonzero base values for the device).

Credential allocator 612 can generate virtual identification values for each of peripherals 670 and 672 and each of channels 690-692. Credential allocator 612 can provide the virtual identification values to endpoint manager 610 to be programmed to credential generators 680-682 by endpoint manager 610. Address space select configurator 614 may be configured to initialize table 662 in IOMMU 660 to associate address space select values with virtual identification values. In the example shown in FIG. 6, the virtual identification values generated by credential generators 680-682 are associated with an address space select value of one.

After transaction mapper 642, firewall 644, IOMMU 660, and peripherals 670 and 672 have been initialized, endpoint manager 610 can start operation of system 600 by causing system 600 to establish a link with a host device. For example, endpoint manager 610 may be configured to start a link training and status state machine to cause system 600 to establish a link with the host device. Once the link is established, the host device may start an enumeration sequence.

Figure 7:
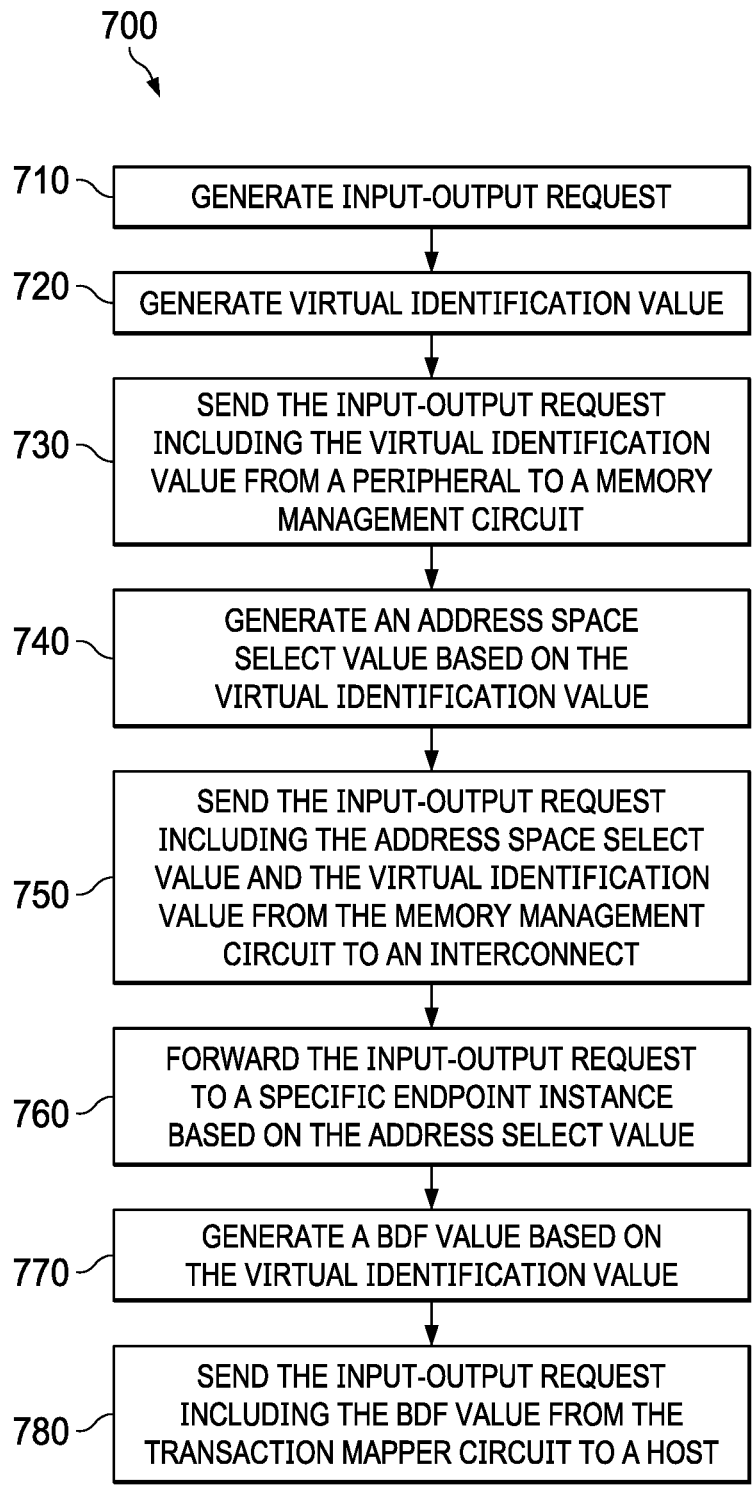
FIG. 7 is a flow diagram of a method for routing an input-output request from a peripheral to a host according to some aspects of the present disclosure.

FIG. 7 is a flow diagram of a method for routing an input-output request from a peripheral to a host according to some aspects of the present disclosure. Some processes of the method 700 may be performed in orders other than described, and many processes may be performed concurrently in parallel. Furthermore, processes of the method 700 may be omitted or substituted in some examples of the present disclosure. The method 700 is described with reference to system 300 shown in FIG. 3, although other entities or components may exemplify similar techniques.

Referring to block 710, peripheral 370 generates an input-output request. The input-output request may include a read request or a write request with an address for the read or write operation. Referring to block 720, credential generator 380 generates a virtual identification value for the input-output request. Credential generator 380 may include an ISC register that stores the virtual identification value. Credential generator 380 can add or append the virtual identification value to the input-output request before sending the input-output request to IOMMU 360.

Referring to block 730, peripheral 370 send the input-output request including the virtual identification value to IOMMU 360. Channel 390 can initiate an outbound input-output request with the appropriate virtual identification value and a destination address for the PCIe host buffer. Referring to block 740, IOMMU 360 generates an address space select value based on the virtual identification value in the input-output request. IOMMU 360 can apply the virtual identification value to a look-up table that associates virtual identification values with address space select values. IOMMU 360 can add or append the address space select value to the input-output request before sending the input-output request to transaction mapper 342. Referring to block 750, IOMMU 360 sends the input-output request to interconnect 354, where the input-output request, as sent by the IOMMU 360, includes the address space select value and the virtual identification value.

Referring to block 760, interconnect 354 forwards the input-output request to a specific endpoint instance (e.g., endpoint 340) based on the address select value. Interconnect 354 can steer transactions to specific endpoint instances based on the address select value in each request. Interconnect 354 may be configured to forward a first request having a first address select value to endpoint 340, forward a second request having a second address select value to an endpoint instance other than endpoint 340, and forward a third request having a third address select value to system memory 352.

Referring to block 770, transaction mapper 342 generates a BDF value based on the virtual identification value in the input-output request. Transaction mapper 342 may be configured to generate the BDF value by applying the virtual identification value to a look-up table that associates BDF values with virtual identification values. Firewall 344 may be configured to verify that the virtual identification value satisfies a threshold range of values before transaction mapper 342 passes the input-output request to bypass path 346. In response to determining that the virtual identification value does not satisfy the threshold range, firewall 344 can cause transaction mapper 342 to discard the input-output request, refrain from sending the input-output request to its destination, and/or output an error signal (e.g., to peripheral 370).

Referring to block 780, transaction mapper 342 sends the input-output request to a host, where the input-output request, as sent by transaction mapper 342, includes the BDF value. The input-output request sent by transaction mapper 342 may not include the address space select value or the virtual identification value. In response to determining that the address space select value in the input-output request satisfies a threshold, transaction mapper 342 can send the input-output request to the host via bypass path 346. In response to determining that the address space select value in the input-output request does not satisfy the threshold, transaction mapper 342 can send the input-output request to the host via outbound translation circuit 348.

Figure 8:
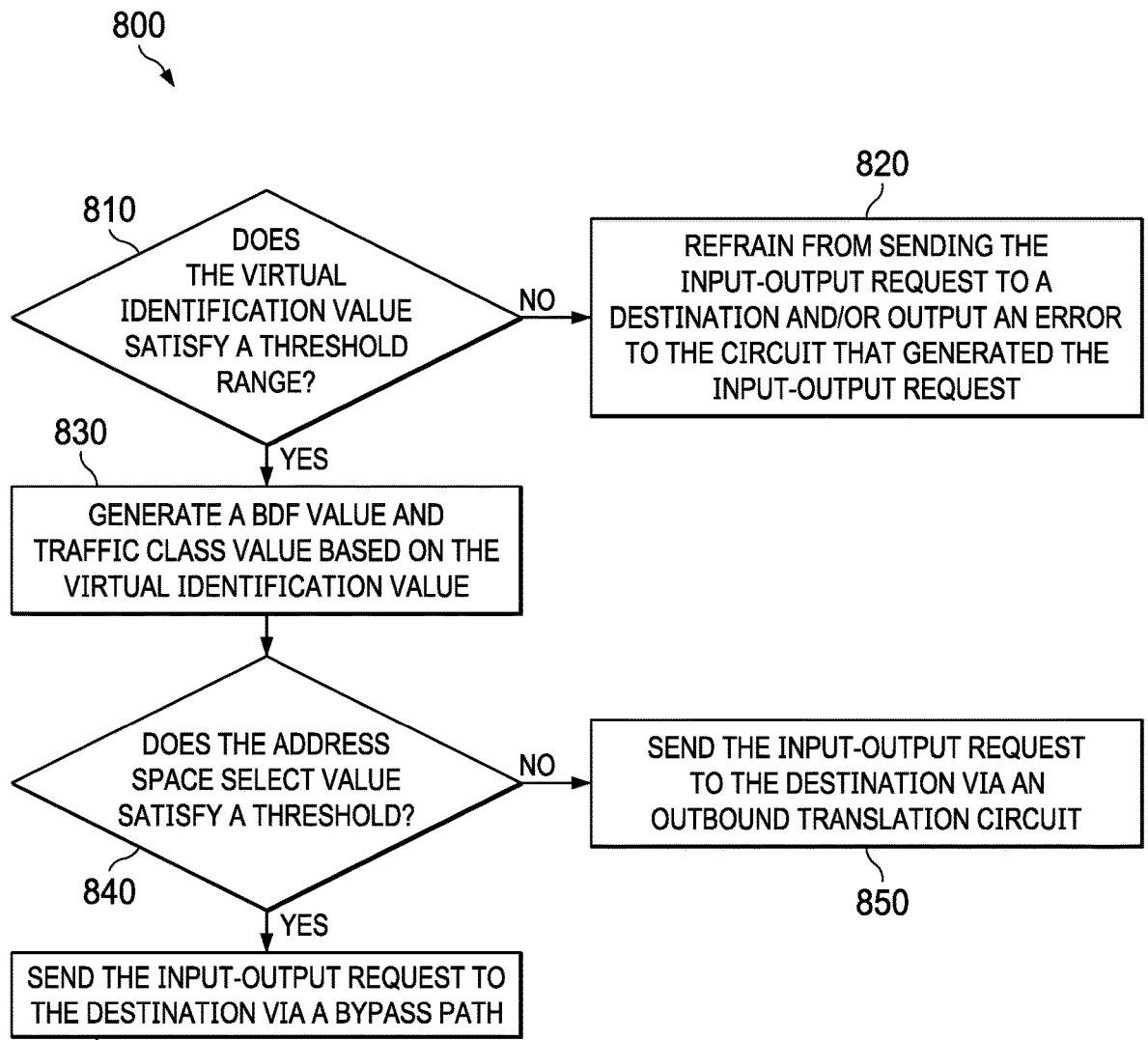
FIG. 8 is a flow diagram of a method for mapping a transaction to a destination according to some aspects of the present disclosure.

FIG. 8 is a flow diagram of a method for mapping a transaction to a destination according to some aspects of the present disclosure. Some processes of the method 800 may be performed in orders other than described, and many processes may be performed concurrently in parallel. Furthermore, processes of the method 800 may be omitted or substituted in some examples of the present disclosure. The method 800 is described with reference to transaction mapper 542 shown in FIG. 5, although other entities or components may exemplify similar techniques.

Referring to block 810, transaction mapper 542 determines whether a virtual identification value satisfies a threshold range. Pseudocode 550 includes an operation that can be executed by controller 530 to mask a portion of the virtual identification value and compare the masked portion to another variable. Referring to block 820, responsive to determining that the virtual identification value does not satisfy a threshold range, transaction mapper 542 refrains from sending the input-output request to the destination indicated in the input-output request and/or outputs an error to the circuit that generated the input-output request. If the virtual identification value does not satisfy the threshold range, transaction mapper 542 can discard the input-output request as invalid.

Referring to block 830, responsive to determining that the virtual identification value satisfies a threshold range, transaction mapper 542 generates a BDF value and a traffic class value based on the virtual identification value. Transaction mapper 542 can apply the virtual identification value to the control input of multiplexer 520 and/or 522 to cause multiplexer 520 and/or 522 to output a BDF value and a traffic class value.

Referring to block 840, transaction mapper 542 determines whether the address space select value in the input-output request satisfies a threshold. In some examples, the threshold range includes all nonzero values. Referring to block 850, responsive to determining that the address space select value in the input-output request does not satisfy the threshold, transaction mapper 542 sends the input-output request to an outbound translation circuit on the way to a destination. Referring to block 860, responsive to determining that the address space select value in the input-output request satisfies the threshold, transaction mapper 542 sends the input-output request to the destination via a bypass path. As sent by transaction mapper 542, the input-output request may include the BDF value and the traffic class value but not the virtual identification value or the address space select value. Methods 700 and 800 can be repeated for each input-output request that is generated by a peripheral within a system of this disclosure.

Figure 9:
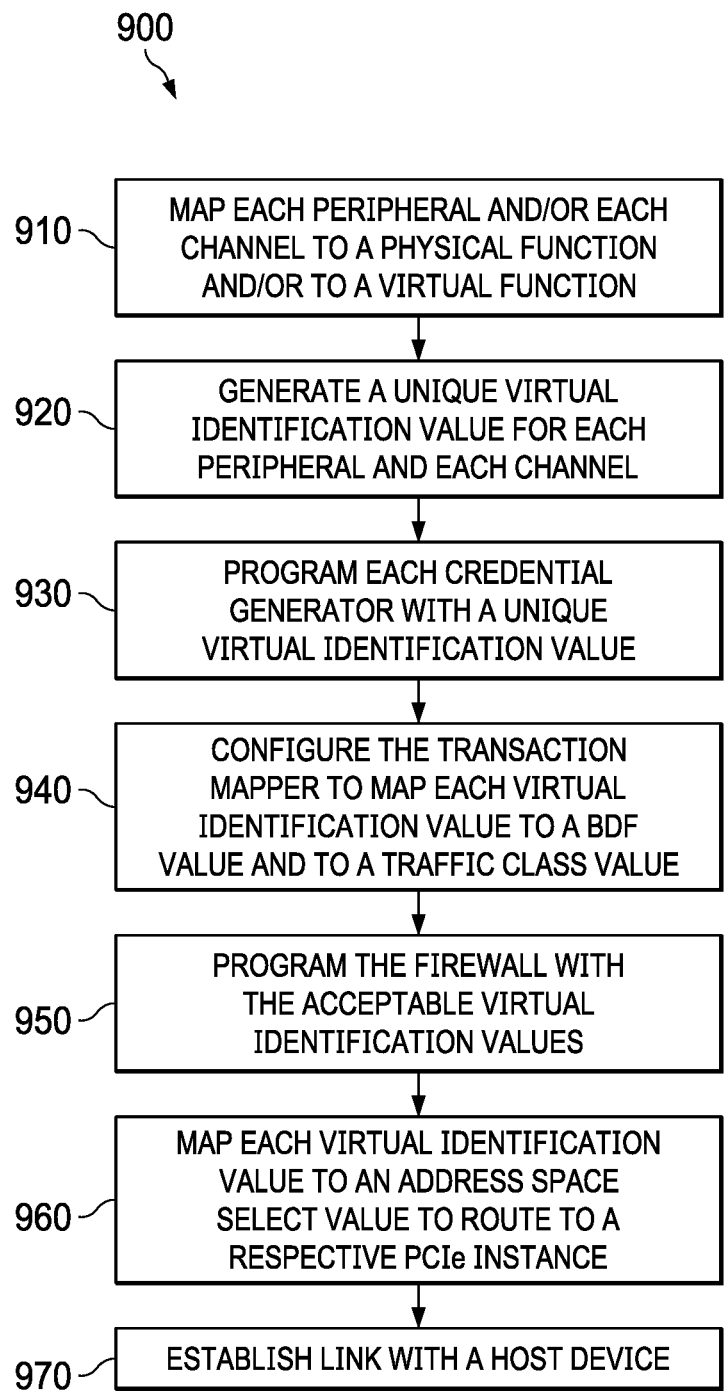
FIG. 9 is a flow diagram of a method for initializing a system for input-output requests according to some aspects of the present disclosure.

FIG. 9 is a flow diagram of a method for initializing a system for input-output requests according to some aspects of the present disclosure. Some processes of the method 900 may be performed in orders other than described, and many processes may be performed concurrently in parallel. Furthermore, processes of the method 900 may be omitted or substituted in some examples of the present disclosure. The method 900 is described with reference to system 600 shown in FIG. 6, although other entities or components may exemplify similar techniques.

Referring to block 910, endpoint manager 610 maps peripherals 670 and 672 to physical functions 620 and 623. Endpoint manager 610 may also map one or more of channels 690-692 to functions 621 and 622. The mapping between peripherals 670 and 672, channels 680-682, and functions 620-623 may be flexible in that endpoint manager 610 can change the mapping during operation of system 600 or during the next initialization sequence.

Referring to block 920, credential allocator 612 generates a unique virtual identification value for each of peripherals 670 and 672 and each of channels 690-692. Referring to block 930, endpoint manager 610 programs each of credential generators 680-682 with the unique virtual identification value generated by credential allocator 612. Endpoint manager 610 can store the virtual identification values to registers within credential generators 680-682.

Referring to block 940, endpoint manager 610 configures transaction mapper 642 to map each virtual identification value to a BDF value and to a traffic class value. Endpoint manager 610 can store the BDF values and the traffic class values to registers within transaction mapper 642. Referring to block 950, endpoint manager 610 programs firewall 644 with acceptable virtual identification values. Endpoint manager 610 may be configured to create a mask variable that aligns with bits in the virtual identification values to define a threshold range.

Referring to block 960, address space select configurator 614 maps each virtual identification value to an address space select value. Endpoint manager 610 may be configured to program the associations between virtual identification values and address space select values to table 662 in IOMMU 660. The address space select values may be used by transaction mapper 642 to route each input-output request to a respective PCIe instance, in some examples. Referring to block 970, endpoint manager 610 establishes a link with a host device. The host device may initiate a standard enumeration sequence after the link is established.

By initializing the components in system 600, endpoint manager 610 may allow for new peripherals to be added to system 600 on the fly. When a new peripheral is connected to system 600, endpoint manager 610 may perform some or all of the steps of method 900 to initialize the new peripheral. For example, endpoint manager 610 may be configured to create a unique virtual identification value for the credential generator in the new peripheral, associate the virtual identification value with a BDF value and a traffic class value in transaction mapper 642, and associate the virtual identification value with an address space select value in table 662.

The techniques of this disclosure may be used with little or no hardware modifications for the peripherals in a PCIe system. Instead, the credential generators in legacy peripherals can be repurposed to generate virtual identification values without any hardware modifications, in some examples. The generation of address space select values can be centralized within a memory management circuit. Consequently, the peripherals are not responsible for generating address space select values, and the system may support all peripherals, including legacy peripherals that lack the capabilities of newer peripherals.

The systems described in this disclosure can support multiple peripherals and multiple functions within a single peripheral. The systems can also support multiple virtual functions within a single peripheral because each channel within the peripheral can generate a unique virtual identification value. The virtual identification value in an input-output request can be used by the memory management circuit and the transaction mapper to assign additional values to the input-output request.

The generation of address space select values, BDF values, and traffic class values within the system may be software configurable. Thus, a control circuit can create the associations between the virtual identification values and the address space select values, BDF values, and traffic class values. The control circuit may be configured to initialize tables inside of the memory management circuit and the transaction mapper circuit at startup. In addition, the control circuit may be configured to update or reprogram the table(s) when a peripheral is added to or removed from the system.

The following numbered aspects demonstrate one or more aspects of the disclosure.

Aspect 1. A system includes a first peripheral circuit and a memory management circuit coupled to the first peripheral circuit. The memory management circuit comprises a first table that associates virtual identification values with address space select values. The system also includes a transaction mapper circuit coupled to the memory management circuit. The transaction mapper circuit comprises a second table that associates virtual identification values with bus-device-function (BDF) values.

Aspect 2. The system of the preceding aspect, further including a second peripheral circuit coupled to the memory management circuit.

Aspect 3. The system of the preceding aspect, wherein the second peripheral circuit comprises a second credential generator.

Aspect 4. The system of the preceding aspect, wherein the second credential generator is configured to generate a second virtual identification value different from a first virtual identification value generated by a first credential generator of the first peripheral circuit.

Aspect 5. The system of the preceding aspect, wherein the first table associates the second virtual identification value with a first address space select value.

Aspect 6. The system of the preceding aspects or any combination thereof, wherein the first peripheral circuit comprises a first credential generator.

Aspect 7. The system of the preceding aspect, wherein the first credential generator is configured to generate a first virtual identification value.

Aspect 8. The system of the preceding aspect, wherein the first table associates the first virtual identification value with a first address space select value.

Aspect 9. The system of the preceding aspect, wherein the first table associates the first and second virtual identification values with the same address space select value.

Aspect 10. The system of the preceding aspects or any combination thereof, wherein the transaction mapper is configured to receive, from the memory management circuit, an input-output request comprising a first virtual identification value.

Aspect 11. The system of aspects 4 and 7-10 or any combination thereof, wherein the transaction mapper is configured to generate a first BDF value and a traffic class value based on the second table and the first virtual identification value.

Aspect 12. The system of the preceding aspect, wherein the transaction mapper is configured to send, to a host, the input-output request including the first BDF value and the traffic class value.

Aspect 13. The system of the preceding aspects or any combination thereof, wherein the transaction mapper includes a firewall.

Aspect 14. The system of the preceding aspect, wherein the firewall is configured to receive an input-output request from the memory management circuit.

Aspect 15. The system of the two preceding aspects or any combination thereof, wherein the firewall is configured to determine that a first virtual identification value in the input-output request does not satisfy a threshold range.

Aspect 16. The system of the preceding aspect, wherein the firewall is configured to refrain from forwarding the input-output request to a host device in response to determining that the first virtual identification value does not satisfy the threshold range.

Aspect 17. The system of the preceding aspects or any combination thereof, wherein the second table includes an array of programmable registers.

Aspect 18. The system of the preceding aspect, wherein each programmable register of the second table is configured to store a respective BDF value and with a respective traffic class value.

Aspect 19. The system of the two preceding aspects or any combination thereof, wherein the second table includes a multiplexer coupled to the array of programmable registers.

Aspect 20. The system of the preceding aspect, wherein the multiplexer is configured to output one of the BDF values and a traffic class based on a virtual identification value received by the transaction mapper as part of an input-output request from the memory management circuit.

Aspect 21. The system of aspects 1 and 6-20 or any combination thereof, wherein the first peripheral circuit comprises a first credential generator and a second credential generator.

Aspect 22. The system of the preceding aspect, wherein the first credential generator is configured to generate a first virtual identification value.

Aspect 23. The system of the preceding aspect, wherein the first table associates the first virtual identification value with a first address space select value.

Aspect 24. The system of the three preceding aspects or any combination thereof, wherein the second peripheral circuit comprises a second credential generator.

Aspect 25. The system of the preceding aspect, wherein the second credential generator is configured to generate a second virtual identification value different from a first virtual identification value generated by a first credential generator of the first peripheral circuit.

Aspect 26. The system of the preceding aspect, wherein the first table associates the second virtual identification value with a first address space select value.

Aspect 27. The system of the preceding aspects or any combination thereof, wherein the first peripheral circuit comprises a first credential generator configured to generate a first virtual identification value, and wherein the first peripheral circuit configured to generate an input-output request including the first virtual identification value.

Aspect 28. The system of the preceding aspects or any combination thereof, wherein the memory management circuit is configured to receive, from the first peripheral circuit, an input-output request comprising a first virtual identification value.

Aspect 29. The system of the preceding aspects or any combination thereof, wherein the memory management circuit is configured to generate a first address space select value based on the first table and a first virtual identification value in an input-output request received from the first peripheral circuit.

Aspect 30. The system of the preceding aspect, send, to the memory management circuit, the input-output request including the first address space select value.

Aspect 31. The system of the preceding aspects or any combination thereof, further including a system on chip, wherein the first peripheral circuit, the memory management circuit, and the transaction mapper circuit are part of the system on chip.

Aspect 32. A method includes generating, by a peripheral, a first input-output request and generating, by the peripheral, a first virtual identification value for the first input-output request. In addition, the method includes sending the first input-output request including the first virtual identification value from the peripheral to a memory management circuit. The method also includes generating, by the memory management circuit, a first address space select value based on the first virtual identification value. The method further includes sending the first input-output request including the first virtual identification value and the first address space select value from the memory management circuit to a transaction mapper circuit. The method includes generating, by the transaction mapper circuit, a first BDF value based on the first virtual identification value. The method also includes sending the first input-output request including the first BDF value from the transaction mapper circuit to a host.

Aspect 33. The method of the preceding aspect, wherein sending the first input-output request from the memory management circuit to the transaction mapper circuit includes sending the first input-output request from the memory management circuit to an interconnect circuit.

Aspect 34. The method of the two preceding aspects or any combination thereof, wherein sending the first input-output request from the memory management circuit to the transaction mapper circuit includes determining, by an interconnect circuit, that the first address select value is associated with an endpoint, wherein the endpoint comprises the transaction mapper circuit.

Aspect 35. The method of the preceding aspect, wherein sending the first input-output request from the memory management circuit to the transaction mapper circuit includes sending the first input-output request from an interconnect circuit to the transaction mapper circuit in response to determining that the first address select value is associated with the endpoint.

Aspect 36. The method of aspects 32-35 or any combination thereof, further including determining that the first address space select value satisfies a threshold.

Aspect 37. The method of the preceding aspect, further including sending the first input-output request to the host through a bypass path in response to determining that the first address space select value satisfies the threshold.

Aspect 38. The method of aspects 32-37 or any combination thereof, wherein the first input-output request is generated by a first peripheral.

Aspect 39. The method of aspects 32-38 or any combination thereof, further including receiving, by the transaction mapper circuit from a second peripheral, a second input-output request including a second virtual identification value, wherein the second virtual identification value is different from the virtual identification value generated for the first input-output request.

Aspect 40. The method of aspects 32-39 or any combination thereof, further including determining, by the transaction mapper circuit, that a second virtual identification value does not satisfy a threshold range.

Aspect 41. The method of the preceding aspect, further including outputting, by the transaction mapper circuit, an error to the second peripheral in response to determining that the second virtual identification value does not satisfy the threshold range.

Aspect 42. The method of aspects 32-38 or any combination thereof, wherein the first input-output request is generated by a first channel in the peripheral, and wherein the first virtual identification value is generated by a first credential generator in the first channel.

Aspect 43. The method of the preceding aspect, further including generating, by a second channel in the peripheral, a second input-output request.

Aspect 44. The method of the preceding aspect, further including generating, by a second credential generator in the second channel, a second virtual identification value for the second input-output request, wherein the second virtual identification value is different from the first virtual identification value.

Aspect 45. The method of the preceding aspect, further including sending the second input-output request including the second virtual identification value from the peripheral to the memory management circuit.

Aspect 46. The method of the preceding aspect, further including generating, by the memory management circuit, a second address space select value based on the second virtual identification value, wherein the second address space select value is identical to the first address space select value.

Aspect 47. The method of the preceding aspect, further including sending the second input-output request including the second virtual identification value and the second address space select value from the memory management circuit to the transaction mapper circuit.

Aspect 48. The method of the four preceding aspects or any combination thereof, further including generating, by the transaction mapper circuit, a second bus-device-function (BDF) value based on the second virtual identification value, wherein the second BDF value is different from the first BDF value.

Aspect 49. The method of the preceding aspect, further including sending the second input-output request including the second BDF value from the transaction mapper circuit to a host.

Aspect 50. The method of aspects 32-42 or any combination thereof, wherein the first input-output request is generated by a first peripheral, and wherein the first virtual identification value is generated by a first credential generator in the first peripheral, the method further including generating, by a second peripheral, a second input-output request and generating, by a second credential generator in the second peripheral, a second virtual identification value for the second input-output request, wherein the second virtual identification value is different from the first virtual identification value.

Aspect 51. The method of the preceding aspect, further including sending the second input-output request including the second virtual identification value from the second peripheral to the memory management circuit.

Aspect 52. The method of the two preceding aspects or any combination thereof, further including generating, by the memory management circuit, a second address space select value based on the second virtual identification value, wherein the second address space select value is identical to the first address space select value.

Aspect 53. The method of the preceding aspect, further including sending the second input-output request including the second virtual identification value and the second address space select value from the memory management circuit to a transaction mapper circuit.

Aspect 54. The method of the four preceding aspects or any combination thereof, further including generating, by the transaction mapper circuit, a second bus-device-function (BDF) value based on the second virtual identification value, wherein the second BDF value is different from the first BDF value.

Aspect 55. The method of the preceding aspect, further including sending the second input-output request including the second BDF value from the transaction mapper circuit to a host.

Aspect 56. A system or a device configured to perform the method of aspects 32-55 or any combination thereof.

Aspect 57. A system including means for performing the method of aspects 32-55 or any combination thereof.

Aspect 58. A non-transitory computer-readable medium having executable instructions stored thereon, configured to be executable by processing circuitry for causing the processing circuitry to perform the method of aspects 32-55 or any combination thereof.

Aspect 59. A method includes mapping a plurality of channels in one or more peripherals to one or more physical functions and one or more virtual functions. In addition, the method includes generating a respective virtual identification value for each channel of the plurality of channels. The method also includes programming a respective credential generator in each channel of the plurality of channels with the respective virtual identification value. The method further includes programming a transaction mapper circuit to map each virtual identification value to a respective bus device function value and to a respective traffic class value. The method includes programming a memory management circuit to map each virtual identification value to a respective address space select value.

Aspect 60. The method of the preceding aspect, further including establishing a link with a host device after programming the credential generators, after programming the transaction mapper circuit, and after programming the memory management circuit.

Aspect 61. The method of the two preceding aspects or any combination thereof, further including programming a firewall with acceptable virtual identification values.

Aspect 62. The method of the three preceding aspects or any combination thereof, wherein mapping the plurality of channels includes mapping each channel of a plurality of channels in a single peripheral to respective virtual function of a plurality of virtual functions.

Aspect 63. The method of the four preceding aspects or any combination thereof, wherein mapping the plurality of channels includes mapping each peripheral of a plurality of peripherals to a respective physical function of a plurality of physical functions.

Aspect 64. A system or a device configured to perform the method of aspects 59-63 or any combination thereof.

Aspect 65. A system including means for performing the method of aspects 59-63 or any combination thereof.

Aspect 66. A non-transitory computer-readable medium having executable instructions stored thereon, configured to be executable by processing circuitry for causing the processing circuitry to perform the method of aspects 59-63 or any combination thereof.

Aspect 67. A method includes determining that a first virtual identification value in a first input-output request satisfies a threshold range and generating a bus device function (BDF) value and a traffic class value based on the first virtual identification value in response to determining that the first virtual identification value satisfies the threshold range. The method also includes determining that a first address select value in the first input-output request satisfies a second threshold and sending the input-output request to a destination via a bypass path in response to determining that the first address select value satisfies the second threshold.

Aspect 68. The method of the preceding aspect, further including determining that a second virtual identification value in a second input-output request does not satisfy the threshold range.

Aspect 69. The method of the preceding aspect, further including refraining from sending the second input-output request to a destination in response to determining that the second virtual identification value does not satisfy the threshold range.

Aspect 70. The method of the two preceding aspects or any combination thereof, further including outputting an error to a circuit that generated the second input-output request in response to determining that the second virtual identification value does not satisfy the threshold range.

Aspect 71. The method of aspects 67-70 or any combination thereof, further including determining that a third address select value in a third input-output request does not satisfy the second threshold Aspect 72. The method of the preceding aspect, further including sending the third input-output request to a destination via an outbound translation circuit in response to determining that the first address select value does not satisfy the second threshold.

Aspect 73. A system or a device configured to perform the method of aspects 67-72 or any combination thereof.

Aspect 74. A system including means for performing the method of aspects 67-72 or any combination thereof.

Aspect 75. A non-transitory computer-readable medium having executable instructions stored thereon, configured to be executable by processing circuitry for causing the processing circuitry to perform the method of aspects 67-72 or any combination thereof.

This disclosure has attributed functionality to hosts 110 and 210, root complexes 112 and 212, switch 120, endpoints 130, 140, 250, 340, and 640, interconnects 254 and 354, peripherals 272, 274, 370, 372, 670, and 672, transaction mappers 342, 542, and 642, firewalls 344 and 644, IOMMUs 360 and 660, credential generators 380-382 and 680-682, channels 390, 391, 490, 492, and 690-692, controller 530, endpoint manager 610, credential allocator 612, and address space select configurator 614. Hosts 110 and 210, root complexes 112 and 212, switch 120, endpoints 130, 140, 250, 340, and 640, interconnects 254 and 354, peripherals 272, 274, 370, 372, 670, and 672, transaction mappers 342, 542, and 642, firewalls 344 and 644, IOMMUs 360 and 660, credential generators 380-382 and 680-682, channels 390, 391, 490, 492, and 690-692, controller 530, endpoint manager 610, credential allocator 612, and address space select configurator 614 may include one or more processors. Hosts 110 and 210, root complexes 112 and 212, switch 120, endpoints 130, 140, 250, 340, and 640, interconnects 254 and 354, peripherals 272, 274, 370, 372, 670, and 672, transaction mappers 342, 542, and 642, firewalls 344 and 644, IOMMUs 360 and 660, credential generators 380-382 and 680-682, channels 390, 391, 490, 492, and 690-692, controller 530, endpoint manager 610, credential allocator 612, and address space select configurator 614 may include any combination of integrated circuitry, discrete logic circuitry, analog circuitry, such as one or more microprocessors, microcontrollers, DSPs, application specific integrated circuits (ASICs), central processing units (CPUs), graphics processing units (GPUs), FPGAs, and/or any other processing resources.

In some examples, hosts 110 and 210, root complexes 112 and 212, switch 120, endpoints 130, 140, 250, 340, and 640, interconnects 254 and 354, peripherals 272, 274, 370, 372, 670, and 672, transaction mappers 342, 542, and 642, firewalls 344 and 644, IOMMUs 360 and 660, credential generators 380-382 and 680-682, channels 390, 391, 490, 492, and 690-692, controller 530, endpoint manager 610, credential allocator 612, and address space select configurator 614 may include multiple components, such as any combination of the processing resources listed above, as well as other discrete or integrated logic circuitry, and/or analog circuitry.

The techniques described in this disclosure may also be embodied or encoded in an article of manufacture including a non-transitory computer-readable storage medium, such as memory 252. Example non-transitory computer-readable storage media may include random access memory (RAM), read-only memory (ROM), programmable ROM (PROM), erasable programmable ROM (EPROM), electronically erasable programmable ROM (EEPROM), flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

It is understood that the present disclosure provides a number of exemplary embodiments and that modification are possible to these embodiments. Such modifications are expressly within the scope of this disclosure. Furthermore, application of these teachings to other environments, applications, and/or purposes is consistent with and contemplated by the present disclosure.

What is claimed is:

1. A transaction mapper circuit comprising:
   a table that associates virtual identification values with bus-device-function (BDF) values; and
   a firewall configured to:
      receive an input-output request including a first virtual identification value of the virtual identification values, the first virtual identification value being associated with a function of an external peripheral,
      generate a first BDF value and a first traffic class value based on the table and the first virtual identification value,
      determine whether the first virtual identification value satisfies a threshold range, and
      determine whether to forward the input-output request to an external host device based on whether the first virtual identification value satisfies the threshold range.

2. The transaction mapper circuit of claim 1, wherein the table includes:
   an array of programmable registers; and
   a multiplexer coupled to the array of programmable registers.

3. The transaction mapper circuit of claim 2, wherein:
   each programmable register of the array of programmable registers is configured to store a respective BDF value and with a respective traffic class value, including to store the first BDF value with the first traffic class value, and
   the multiplexer is configured to output the first BDF value and the first traffic class value based on the first virtual identification value received by the transaction mapper circuit as part of the input-output request.

4. The transaction mapper circuit of claim 1, wherein the firewall is further configured to receive an address space select value that is associated with the transaction mapper circuit and the first virtual identification value.

5. The transaction mapper circuit of claim 1, wherein:
   the firewall is configured to forward the input-output request to the external host device when it is determined that the first virtual identification value satisfies the threshold range, and
   the firewall is configured to refrain from forwarding the input-output request to the external host device when it is determined that the first virtual identification value does not satisfy the threshold range.

6. The transaction mapper circuit of claim 1, wherein the transaction mapper circuit is part of a Peripheral Component Interconnect Express (PCIe) endpoint.

7. A method comprising:
   receiving, by a transaction mapper circuit, an input-output request including a first virtual identification value and an address space select value, the first virtual identification value being associated with a function of an external peripheral and the address space select value being based on the first virtual identification value;
   generating, by the transaction mapper circuit, a first bus-device-function (BDF) value based on the first virtual identification value, using a table that associates virtual identification values with BDF values, the first virtual identification value being associated with the first BDF value in the table;
   determining, by the transaction mapper circuit, whether the first virtual identification
   value
satisfies a threshold range; and
   determining, by the transaction mapper circuit, whether to forward the input-output request to an external host device based on whether the first virtual identification value satisfies the threshold range.

8. The method of claim 7, further comprising:
   generating, by the transaction mapper circuit, a traffic class value based on the first virtual identification value.

9. The method of claim 7, further comprising:
   sending the input-output request to the external host device when it is determined that the first virtual identification value satisfies the threshold range.

10. The method of claim 7, further comprising:
    refraining from sending the input-output request to the external host device when it is determined that the first virtual identification value does not satisfy the threshold range.

11. The method of claim 7, further comprising:
    generating, by a peripheral, the input-output request;
    generating, by a credential generator associated with the peripheral, the first virtual identification value for the input-output request; and
    sending the input-output request including the first virtual identification value to a memory management circuit.

12. The method of claim 11, further comprising:
    obtaining, by the memory management circuit, the address space select value based on the first virtual identification value; and
    sending the input-output request to an interconnect circuit.

13. The method of claim 12, further comprising:
    determining, by the interconnect circuit, that the address space select value is associated with an endpoint, wherein the endpoint includes the transaction mapper circuit; and
    sending, by the interconnect circuit, the input-output request to the transaction mapper circuit in response to determining that the address space select value is associated with the endpoint.

14. The method of claim 13, further comprising:
    determining that the address space select value satisfies a threshold; and sending the input-output request to the external host device through a bypass path in response to determining that the address space select value satisfies the threshold.

15. A system comprising:
a first peripheral circuit including first and second channels and first and second credential generators associated with the first and second channels, respectively;
a second peripheral circuit including a third credential generator;
a memory management circuit coupled to the first and second peripheral circuits; and
a transaction mapper circuit coupled to the memory management circuit;
wherein the first and second credential generators are configured to generate first and second virtual identification values, respectively, the first virtual identification value establishing a unique association between the first channel and a first function of the first peripheral circuit, and the second virtual identification value establishing a unique association between the second channel and a second function of the first peripheral circuit.

16. The system of claim 15, further comprising:
an interconnect circuit coupled to the first, second and third credential generators and to the transaction mapper circuit.

17. The system of claim 15, wherein the transaction mapper circuit includes a firewall.

18. The system of claim 15, wherein the transaction mapper circuit includes a first table that associates each virtual identification value including the first and second virtual identification values with a respective bus-device-function (BDF) value and to a respective traffic class value.

19. The system of claim 18, wherein the memory management circuit includes a second table that associates each virtual identification value including each of the first and second virtual identification values to a respective address space select value.

20. The system of claim 15, wherein the third credential generator is configured to generate a third virtual identification value that establishes a unique association between a third function of the second peripheral circuit.

* * * * *